United States Patent
Chellappan et al.

(10) Patent No.: US 12,147,504 B2
(45) Date of Patent: Nov. 19, 2024

(54) SYSTEMS AND METHODS FOR CLASSIFYING MOSQUITOES BASED ON EXTRACTED MASKS OF ANATOMICAL COMPONENTS FROM IMAGES

(71) Applicant: University of South Florida, Tampa, FL (US)

(72) Inventors: Sriram Chellappan, Tampa, FL (US); Mona Minakshi, DeKalb, IL (US); Pratool Bharti, DeKalb, IL (US); Ryan M Carney, Temple Terrace, FL (US)

(73) Assignee: University of South Florida, Tampa, FL (US)

( * ) Notice: Subject to any disclaimer, the term of this patent is extended or adjusted under 35 U.S.C. 154(b) by 462 days.

(21) Appl. No.: 17/462,809

(22) Filed: Aug. 31, 2021

(65) Prior Publication Data
US 2023/0077353 A1    Mar. 16, 2023

(51) Int. Cl.
G06K 9/00 (2022.01)
G06F 18/21 (2023.01)
(Continued)

(52) U.S. Cl.
CPC ............ *G06F 18/24* (2023.01); *G06F 18/211* (2023.01); *G06F 18/213* (2023.01); *G06F 18/217* (2023.01); *G06F 18/253* (2023.01); *G06F 18/254* (2023.01); *G06N 3/02* (2013.01); *G06N 3/045* (2023.01); *G06N 3/0464* (2023.01); *G06N 3/09* (2023.01); *G06N 20/20* (2019.01);
(Continued)

(58) Field of Classification Search
None
See application file for complete search history.

(56) References Cited

U.S. PATENT DOCUMENTS 7,496,228 B2 *  2/2009  Landwehr ............. G06V 10/46
                                                    382/165
10,013,507 B2 *  7/2018  Zhang .................... G06V 20/64
(Continued)

FOREIGN PATENT DOCUMENTS

CN      108182384 A  *  6/2018  ......... G06K 9/00248
CN      112489119 A  *  3/2021  ............ G06K 9/629
WO  WO-2021087685 A1 *  5/2021  ........... G06K 9/0063

OTHER PUBLICATIONS

Zheng et al., "A Bilinear Multi-Scale Convolutional Neural Network for Fine-grained Object Classification." IAENG International Journal of Computer Science 45, No. 2 (2018). (Year: 2018).*

(Continued)

*Primary Examiner* — Feng Niu
(74) *Attorney, Agent, or Firm* — Meunier Carlin & Curfman LLC

(57) ABSTRACT

Images of an insect are subjected to at least a first convolutional neural network to develop feature maps based on anatomical pixels at corresponding image locations in the respective feature maps. The anatomical pixels correspond to a body part of the insect. A computer calculates an outer product of the first feature map and the second feature map to form an integrated feature map. Extracting fully connected layers from respective sets of integrated feature maps and applying the fully connected layers to a classification network for identifying the genus and the species of the insect.

16 Claims, 7 Drawing Sheets

(51) Int. Cl.

| | |
|---|---|
| *G06F 18/211* | (2023.01) |
| *G06F 18/213* | (2023.01) |
| *G06F 18/24* | (2023.01) |
| *G06F 18/25* | (2023.01) |
| *G06N 3/02* | (2006.01) |
| *G06N 3/045* | (2023.01) |
| *G06N 3/0464* | (2023.01) |
| *G06N 3/09* | (2023.01) |
| *G06N 20/20* | (2019.01) |
| *G06V 10/32* | (2022.01) |
| *G06V 10/422* | (2022.01) |
| *G06V 10/82* | (2022.01) |
| *G06V 40/10* | (2022.01) |

(52) U.S. Cl.
CPC ............ *G06V 10/32* (2022.01); *G06V 10/422* (2022.01); *G06V 10/82* (2022.01); *G06V 40/10* (2022.01)

(56) References Cited

U.S. PATENT DOCUMENTS

| | | | | |
|---|---|---|---|---|
| 10,223,611 | B1* | 3/2019 | Price | G06F 18/24 |
| 10,311,337 | B1* | 6/2019 | Kim | G06V 20/00 |
| 10,740,896 | B2* | 8/2020 | Georgescu | G06N 20/00 |
| 10,878,219 | B2 | 12/2020 | Zhou et al. | |
| 10,878,569 | B2* | 12/2020 | Akselrod-Ballin | G06V 10/764 |
| 10,902,588 | B2 | 1/2021 | Harouni et al. | |
| 11,055,851 | B2* | 7/2021 | Novikov | G06N 3/08 |
| 11,113,583 | B2* | 9/2021 | Kobayashi | G06V 20/10 |
| 11,151,423 | B2* | 10/2021 | Zha | G05B 13/048 |
| 11,195,037 | B2* | 12/2021 | Lu | G06N 3/045 |
| 11,232,318 | B2* | 1/2022 | Yi | G06V 10/454 |
| 11,315,030 | B2* | 4/2022 | Cataltepe | G06F 18/2178 |
| 11,328,525 | B2* | 5/2022 | Lagerman | G06Q 50/02 |
| 11,449,998 | B2* | 9/2022 | Georgescu | G06T 7/0014 |
| 11,503,819 | B2* | 11/2022 | Taylor | A01M 1/026 |
| 11,586,890 | B2* | 2/2023 | Whatmough | G06N 3/04 |
| 11,604,992 | B2* | 3/2023 | Fusi | G06N 5/01 |
| 11,663,802 | B2* | 5/2023 | Xu | G06V 10/774 |
| | | | | 382/110 |
| 11,785,926 | B2* | 10/2023 | Lepek | G06V 10/764 |
| | | | | 706/2 |
| 2005/0025357 | A1* | 2/2005 | Landwehr | A01M 3/005 |
| | | | | 382/224 |
| 2015/0006117 | A1* | 1/2015 | Zhang | G06V 20/64 |
| | | | | 703/2 |
| 2018/0121764 | A1* | 5/2018 | Zha | G05B 13/048 |
| 2019/0206056 | A1* | 7/2019 | Georgescu | G06T 7/0014 |
| 2019/0279102 | A1* | 9/2019 | Cataltepe | G06V 10/77 |
| 2019/0304092 | A1* | 10/2019 | Akselrod-Ballin | G06N 3/084 |
| 2020/0005061 | A1* | 1/2020 | Lu | G06V 20/41 |
| 2020/0074205 | A1* | 3/2020 | Yi | G06V 10/82 |
| 2020/0143231 | A1* | 5/2020 | Fusi | G06N 3/082 |
| 2020/0302222 | A1* | 9/2020 | Kobayashi | G06F 18/253 |
| 2020/0364867 | A1* | 11/2020 | Georgescu | G06F 18/24133 |
| 2021/0022326 | A1* | 1/2021 | Lepek | A01K 67/033 |
| 2021/0045375 | A1* | 2/2021 | Taylor | A01M 1/026 |
| 2021/0166114 | A1* | 6/2021 | Kalsi | G06F 17/16 |
| 2021/0192323 | A1* | 6/2021 | Whatmough | G06N 3/045 |
| 2022/0148313 | A1* | 5/2022 | Huang | G10L 25/57 |
| 2022/0167066 | A1* | 5/2022 | Yu | G06N 3/045 |
| 2022/0188568 | A1* | 6/2022 | Singh | G06F 18/2148 |
| 2022/0222914 | A1* | 7/2022 | Pradhan | G06V 10/7715 |
| 2022/0358742 | A1* | 11/2022 | Xu | G06V 10/22 |
| 2022/0367053 | A1* | 11/2022 | Mahmood | G16B 40/20 |
| 2022/0391628 | A1* | 12/2022 | Sawal | G06F 18/2413 |
| 2023/0014105 | A1* | 1/2023 | Pan | G06T 7/70 |
| 2023/0306489 | A1* | 9/2023 | Kong | G06V 20/52 |
| | | | | 705/26.64 |

OTHER PUBLICATIONS

Adhane et al., "A deep convolutional neural network for classification of aedes albopictus mosquitoes." IEEE Access 9 (2021): 72681-72690. (Year: 2021).*

Lin et al., "Bilinear Convolutional Neural Networks for Fine-Grained Visual Recognition," in IEEE Transactions on Pattern Analysis and Machine Intelligence, vol. 40, No. 6, pp. 1309-1322, Jun. 1, 2018, doi: 10.1109/TPAMI.2017.2723400. (Year: 2018).*

Liu et al., "From BoW to CNN: Two Decades of Texture Representation for Texture Classification." arXiv preprint arXiv:1801.10324 (2018). (Year: 2018).*

Prellberg et al., "Multi-label classification of surgical tools with convolutional neural networks." In 2018 international joint conference on neural networks (IJCNN), pp. 1-8. IEEE, 2018. (Year: 2018).*

Antanas Verikas, Arunas Lipnickas, Kerstin Malmqvist, Marija Bacauskiene, and Adas Gelzinis. 1999. Soft combination of neural classifiers: A comparative study. Pattern recognition letters 20, 4 (1999), 429-444.

He, Kaiming, Xiangyu Zhang, Shaoqing Ren, and Jian Sun. "Deep residual learning for image recognition." In Proceedings of the IEEE conference on computer vision and pattern recognition, pp. 770-778. 2016.

Jia Deng, Wei Dong, Richard Socher, Li-Jia Li, Kai Li, and Li Fei-Fei. 2009. Imagenet: A large-scale hierarchical image database. In 2009 IEEE conference on computer vision and pattern recognition. IEEE, 248-255.

Kaiming He, Georgia Gkioxari, Piotr Dollár, and Ross Girshick. 2017. Mask r-cnn. In Proceedings of the IEEE international conference on computer vision. 2961-2969.

Manzil Zaheer, Sashank Reddi, Devendra Sachan, Satyen Kale, and Sanjiv Kumar. 2018. Adaptive methods for nonconvex optimization. In Advances in neural information processing systems. 9793-9803.

Nathan D Burkett-Cadena. 2013. Mosquitoes of the southeastern United States. University of Alabama Press.

Nitish Srivastava, Geoffrey Hinton, Alex Krizhevsky, Ilya Sutskever, and Ruslan Salakhutdinov. 2014. Dropout: a simple way to prevent neural networks from overfitting. The journal of machine learning research 15, 1 (2014), 1929-1958.

Park, Junyoung, et al. "Classification and morphological analysis of vector mosquitoes using deep convolutional neural networks." Scientific reports 10.1 (2020): 1-12. https://www.nature.com/articles/s41598-020-57875-1.

Sergey Ioffe and Christian Szegedy. 2015. Batch normalization: Accelerating deep network training by reducing internal covariate shift. arXiv preprint arXiv:1502.03167 (2015).

SM, Jahangir Alam, Hu Guoqing, and Cheng Chen. "Characteristics Analysis and Detection Algorithm of Mosquitoes." (2014). https://www.researchgate.net/publication/270722518_Characteristics_Analysis_and_Detection_Algorithm_of_Mosquitoes.

Stewart, Matthew Ph.D. Simple Introduction to Convolutional Neural Networks in Towards Data Science located at https://towardsdatascience.com/simple-introduction-to-convolutional-neural-networks-cdf8d3077bac. Feb. 26, 2019.

Tsung-Yu Lin, Aruni RoyChowdhury, and Subhransu Maji. 2015. Bilinear cnn models for fine-grained visual recognition. In Proceedings of the IEEE international conference on computer vision. 1449-1457.

Vissamsetty, Sumanth. Thesis. "Mosquito Image Classification using Convolutional Neural Networks." (2019), 44 pages. https://digitalcommons.lsu.edu/gradschool_theses/4889.

Xavier Glorot and Yoshua Bengio. 2010. Understanding the difficulty of training deep feedforward neural networks. In Proceedings of the thirteenth international conference on artificial intelligence and statistics. 249-256.

Yuan Yao, Lorenzo Rosasco, and Andrea Caponnetto. 2007. On early stopping in gradient descent learning. Constructive Approximation 26, 2 (2007), 289-315.

* cited by examiner

SYSTEMS AND METHODS FOR CLASSIFYING MOSQUITOES BASED ON EXTRACTED MASKS OF ANATOMICAL COMPONENTS FROM IMAGES

BACKGROUND

Taxonomy is the process of classifying organisms in nature. Entomology is the study of insect organisms. Taxonomy in the context of entomology is a relatively obscure discipline in the era of modern sciences. Very few people want their professional careers spent with hours poring through a microscope trying to identify what genus and species an insect is. In the context of mosquitoes, there are close to 4500 different species of mosquitoes, and training to identify all of these mosquitoes is hard if not impossible. In countries like India, Bangladesh and even the US, it is simply not possible to train professionals to identify all mosquitoes that are endemic in these countries (e.g., there are 400 species of mosquitoes endemic to India; and about 150 species in the US). With increasing travel and global connectivity among nations, mosquitoes can invade to newer places, and identifying the "new" mosquitoes becomes impossible by local professionals. Mosquitos and other insects are considered "vectors" because they can carry viruses, bacteria, and strains of diseases and transmit them to humans. The term "vector" is therefore given its broadest meaning in the art of infectious diseases.

Modern entomology updates have focused on eliminating or minimizing human involvement in classifying genus and species of mosquitoes during disease outbreak. There are close to 4500 different species of mosquitoes in the world spread across 45 or so genera. Out of these, only handfuls of species across three genus types spread the deadliest diseases. These mosquitoes belong to *Aedes* (Zika, Dengue, Chikungunya, Yellow Fever), *Culex* (West Nile Virus, and EEE), and *Anopheles* (Malaria). Within these three genera, the deadliest species are *Aedes aegypti, Aedes albopictus, Culex nigripalpus, Anopheles gambiae* and *Anopheles stephensi*. When a mosquito-borne disease, say Dengue affects a region, then identifying the presence of the particular vectors for Dengue (i.e., *Aedes aegypti* and *Aedes albopictus*) becomes important. This is hard and expensive. For instance in India, there are close to 450 types of mosquitoes spread all over. Accordingly, public health experts lay traps in disease prone areas, and sometimes hundreds of mosquitoes get trapped. Now, however, they can identify which of those is the genus and species they are looking for. Because, once they identify the right mosquitoes, they can then take those mosquitoes to the lab for DNA testing etc. to see if the pathogen (i.e., virus) is there within the trapped mosquito. Naturally, if they find a reasonable large number of those mosquitoes with the virus in them, there is a public health crisis, and corrective action needs to be taken.

Other efforts have focused on detecting foreign mosquitoes at borders. This is a problem that is attracting a lot of global attention—the need to identify if a mosquito in borders of a nation (land or sea or air or road) is a foreign mosquito. For instance, consider a scenario in which mosquitos, e.g., both a domestic vector and one non-native to the US, are on a vehicle entering the US borders.

Assuming that borders do have mosquito traps, it is likely that this "new" breed of mosquito could get trapped along with other local mosquitoes. The question here is how public health authorities identify that a "foreign" mosquito is in one such trap. Current entomology classification systems would require going periodically to these traps, collecting and studying subjects through a microscope, and identifying specimens one by one. This is impossibly cumbersome if the goal is to only detect a particular type of "foreign" mosquito.

Current disease models rely upon proper classification of infection vectors. The entomology classification systems need to be improved for use in specialized and detail intensive instances, such as the hypothetical above. A need exists in the art of entomological classification to include algorithms that are adaptable for use in resolving important, yet hard to pinpoint issues, such as identifying the hypothetical "foreign" mosquito that did indeed get trapped. Updated algorithms are needed to provide researchers with options in entomological classification for specialized situations, such as the hypothetical random occurrence of new insects affecting a local population.

Continuing with the "foreign" mosquito example, the art of entomological classifications needs improved techniques and models that have been trained with images of the foreign mosquito (provided by international partners) to identify the genus and species directly from initial observations. In the alternative, a need should be met to enable running the foreign mosquito through models trained with other mosquitoes. These techniques would allow researchers to notify public health officials that a new mosquito, that appears to be previously unknown in a given location, has been currently trapped. In either case, there is significant benefit for public health at borders.

As detailed in this disclosure, to address the above noted inadequacies, digitizing anatomies of mosquito specimens across the globe (with citizen and expert involvement) will help create a massive repository of mosquito anatomy images tagged with genus and species types. This repository could then be used for training personnel, and also for automatic identification using algorithms in this disclosure (when a picture is uploaded). For instance and without limiting this disclosure, the Florida Medical Entomology Lab in Vero Beach trains a very small number of personnel each year (both international and also domestic military personnel) in the detailed art of insect classification. From prior investigations, space is very limited, and many are turned away from these kinds of training programs. With a digital repository in place, the training programs can be globally expanded as well with potentially thousands of images to train interested personnel.

The need for these kinds of improvements in entomological classification is apparent in at least one example. Many states and counties in India (especially those at borders) have been and are currently willing to pay for such a service. Such a service with appropriate mosquito traps and can be deployed in international airplanes, ships and buses.

In another expression of the needs in this arena, soldiers going to countries where mosquito-borne diseases are common are routinely trained to help local communities identify mosquitoes and other vectors for disease. A digital repository can train soldiers remotely without having to physically travel to a location in need for these services. Furthermore, soldiers and even personnel from government agencies engaged in traveling and residing overseas might benefit from a trap in the bases and/or homes that can tell them decipher the type of mosquitoes trapped in their vicinity, and how dangerous they are.

BRIEF SUMMARY OF THE DISCLOSURE

This disclosure presents a system to design state of the art artificial intelligence (AI) techniques, namely techniques based on mask region-based convolutional neural networks to extract anatomical components of mosquitoes from digital images and archiving them permanently based on genus, species and other taxonomies.

In one embodiment, a system for identifying a genus and species of an insect utilizes an imaging device configured to generate images of the insect. A computer processor is connected to memory storing computer implemented commands in software, with the memory receiving the images. The software implements a computerized method with respective images by applying a first convolutional neural network to the respective images to develop at least a first feature map and a second feature map based on anatomical pixels at corresponding image locations in the respective feature maps, the anatomical pixels corresponding to a body part of the insect; calculating an outer product of the first feature map and the second feature map; forming an integrated feature map from the first feature map and the second feature map; extracting fully connected layers from respective sets of integrated feature maps that have had the first convolutional neural network applied thereto; and applying the fully connected layers to a classification network for identifying the genus and the species of the insect.

In another embodiment, a system for identifying a genus and species of an insect utilizes an imaging device configured to generate images of the insect. A computer processor is connected to memory storing computer implemented commands in software, and the memory receives the images. The software implements steps of applying a first convolutional neural network to the respective images to develop at least a first feature map directed to anatomical pixels at corresponding image locations in the respective images, the anatomical pixels corresponding to a body part of the insect; applying a second convolutional neural network to the respective images to develop at least a second feature map directed to anatomical pixels at corresponding image locations in the respective images, said anatomical pixels corresponding to the body part of the insect; calculating an outer product of the first feature map and the second feature map; forming an integrated feature map from the first feature map and the second feature map; extracting fully connected layers from respective sets of integrated feature maps that have had the first convolutional neural network and the second convolutional neural network applied thereto; and applying the fully connected layers to a classification network for identifying the genus and the species of the insect.

In another embodiment, a computerized method of identifying a genus and species of an insect includes acquiring images of an insect and storing pixels data from the images in a computer memory in data communication with a computer processor. The computer processor performs the steps of applying at least one convolutional neural network to the respective images to develop at least a first feature map and a second feature map based on anatomical pixels at corresponding image locations in the respective feature maps, said anatomical pixels corresponding to a body part of the insect; calculating an outer product of the first feature map and the second feature map; forming an integrated feature map from the first feature map and the second feature map; extracting fully connected layers from respective sets of integrated feature maps that have had at least the first convolutional neural network applied thereto; and applying the fully connected layers to a classification network for identifying the genus and the species of the insect.

BRIEF DESCRIPTION OF THE FIGURES

The patent application file or the patent issuing therefrom contains at least one drawing executed in color. Copies of this patent or patent application publication with the color drawing(s) will be provided by the Office upon request and payment of the necessary fee. Reference will now be made to the accompanying drawings, which are not necessarily drawn to scale.

DETAILED DESCRIPTION

There are close to 50 different species of mosquitoes in Hillsborough County in Florida. But to keep the problem tractable, without losing the focus on public health, this disclosure looks for vectors of critical interest. From among the hundreds of mosquitoes trapped in respective traps, 250 specimens were identified as critically important vectors by numerous taxonomy partners. These vectors were categorized into three species each belonging the three genera—*Aedes* 100, *Anopheles* 115 and *Culex* 120. The dataset is presented in Table 1. Importantly, mosquitoes belonging to the *Aedes* 100, *Anopheles* 100 and *Culex* 120 genera, are also the deadliest vectors across the globe.

TABLE 1

Relevant Details on our Dataset of Mosquito Species [1]

| Genus | Thorax | Abdomen | Wing | Leg | Number of Image Samples | Diseases Spread | Geographical Location |
|---|---|---|---|---|---|---|---|
| *Aedes* | 981 | 875 | 1173 | 1607 | 1000 | Chikungunya, Dengue, Eastern Equine Encephalitis, West Nile, Yellow Fever, Zika | Africa, Asia, North America, South America |
| *Anopheles* | 1186 | 1042 | 2160 | 2690 | 1250 | Malaria | Africa, Asia, North America, South America |
| *Culex* | 897 | 840 | 1095 | 1468 | 1000 | Eastern Equine Encephalitis, St. Louis Encephalitis, West Nile | Africa, Asia, North America, South America |

Figure 1:
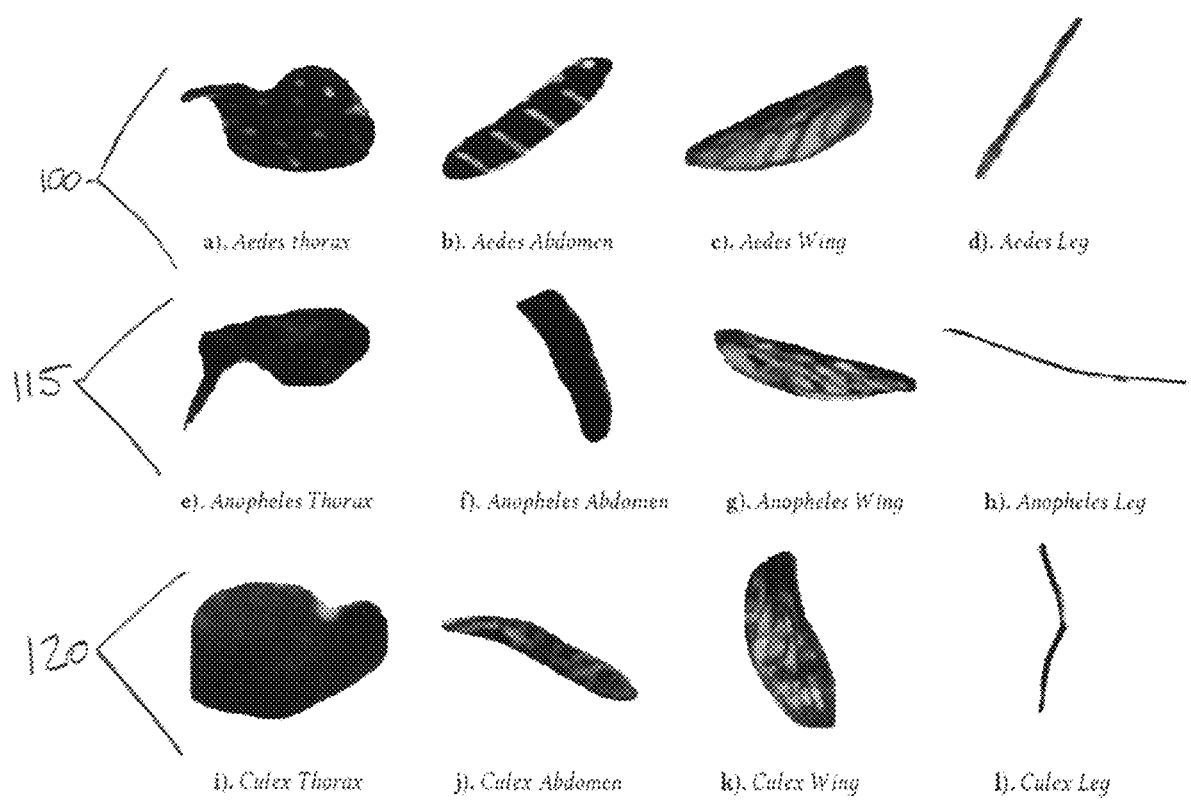
FIG. 1 illustrates one representative sample in a dataset for each anatomy of three genera classified according to this disclosure.

Subsequently, each specimen was imaged under normal indoor light conditions with imaging devices, such as but not limited to, ten different smartphones, across three orientations, and on three different backgrounds. To capture the images generated by the imaging devices, the smart-phone was attached to a movable fixture above a flat surface on which the mosquito was placed. The ten phones used for imaging were Samsung Galaxy S8 (3 phones), Samsung Galaxy S9 (2 phones), iPhone 7 (2 phones), iPhone 8 plus (2 phones), and Pixel 3 (1 phone). As a result of this process, 3550 images in total were captured by a team of investigators. FIG. 1 illustrates one representative image from a dataset of each of the three genera (spread across three genera) classified in this paper.

After that, as described herein, a Mask-RCNN 200 based algorithm has been used to segment anatomies from a full-body mosquito image. In result, this disclosure reports extracting 3064 thorax, 2757 abdomen, 4459 wing, and 5533 leg anatomies from 3250 full-body mosquito images. This embodiment kept 300 images for testing the ensemble of four anatomy models. Due to occlusion, camera angle and mosquito orientation, not each anatomy is visible in every full-body image that caused the unequal distribution of anatomies in the dataset.

These mosquitoes belong to three classes of genera—*Aedes* 100, *Anopheles* 115 and *Culex* 120. Within *Aedes* genus 100, each belongs to *Aedes aegypti, Aedes taeniorhynchus*, and *Aedes infirmatus* species of mosquitoes. Similarly for *Anopheles* genus 115, each belongs to *Anopheles crucians, Anopheles quadrimaculatus, and Anopheles stephensi*. Considering the *Culex* genus 120, it has *Culex coronator, Culex nigripalpus*, and *Culex salinarius* species. To make sure, anatomical images do not get distorted, this disclosure includes padding the images with white background pixels to maintain the square shape as shown in FIG. 1 (*a-l*). Further, this disclosure includes dividing the anatomy dataset into three subsets—training, validation, and testing with the ratio of 70%, 20%, and 10% as respectively considered examples.

The architecture of a Neural Network algorithm classifies the anatomy images taken from a smartphone into 3 genus categories—*Aedes* 100, *Anopheles* 115, and *Culex* 120. The methods, systems, and apparatuses of this disclosure trained four different neural network algorithms, one for each anatomy to predict the genus category. Since each network is based on the similar architecture, to reduce the redundancy, this disclosure includes, but is not limited to, an example algorithm trained on the thorax image FIG. 1 (*a-l*). Classifications of other portions of a subject anatomy are also within the scope of this disclosure.

Figure 2:
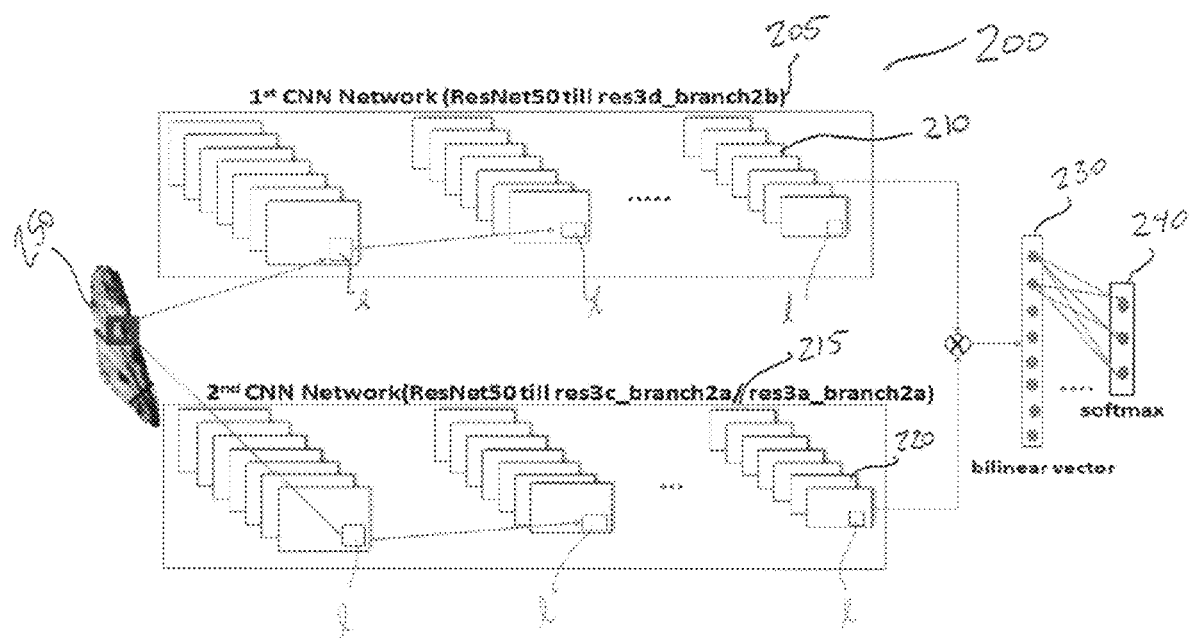
FIG. 2 illustrates one representative sample of a Bilinear CNN architecture used in example embodiments of this disclosure.

The problem of classifying anatomies from smartphone images is complex and challenging. Some of the major challenges include poor image quality and very subtle intra-class variance. The differences in anatomy across different classes of genus are so subtle that they can be missed by many factors like anatomy orientation in the image, background noise, blurriness, and lighting condition. For instance, while both *Aedes* 100 and *Anopheles* 115 genera have dark wings, *Anopheles* 115 has additional tiny dark spots on their wings (FIG. 1(*g*)). Similarly *Aedes* 100 has a black and white pattern on the abdomen (FIG. 1(*c*)) whereas *Anopheles* 115 has only a black abdomen (FIG. 1(*f*)). To overcome these challenges, this disclosure presents a neural network architecture based on the bilinear convolutional neural network (B-CNNs) [6] as shown in FIG. 2 200. The B-CNN architecture 200 suits perfectly to the problem considering it includes learning the subtle differences between similar looking classes.

In this architecture, the disclosure includes two convolutional neural networks (CNN) NA 205 and NB 215 to extract two feature maps 210, 220 from the convolutional layer, one from each network 205, 215. NA and NB can be the same or different networks but their feature maps should be distinct. In one embodiment, the CNN may be a first convolutional neural network, and in a different embodiment, there may be a first convolutional neural network and a second convolutional neural network. For example, if both are the same network then feature maps 210, 220 will be extracted from different convolutional layers to make them distinct. Mainly, this architecture consists of six elements $\beta$=(NA, NB, fA, fB, P, C). In one non-limiting aspect, fA and fB are the feature maps 210, 220 (i.e., a first feature map 210 and a second feature map 220) obtained from the convolution layer of NA 205 and NB 215, P is the pooling function and C is the classification function. In the problem, both fA and fB consists of M number of filters, FIG. 8, Ref. 806, where M=128. Each filter 806 learns a specific feature at each layer 205, 210, 808. In B-CNN architecture, this disclosure calculates an outer product of feature maps fA 210 and fB 220 at each location of the image, I 250. The outer product of fA and fB at a location l in an image I 250 (shown in FIG. 2) is computed as $(fA(l,I)^T fB(l,I))$, where T is a transposed vector value. The outer product combines both CNN feature maps 210, 220 at each corresponding image location in respective feature maps and results in pairwise feature interactions in a translation invariant manner. These pairwise feature interactions capture the subtle and minute details of anatomical pixels from the images, wherein the anatomical pixels correspond to a body part of a subject insect in the class. For example, the *Anopheles* genus 115 has black wings with dark spots, so the feature map from NA 205 might capture the black color independently while another feature map at the same location from NB 215 might capture the dark spots. Using these feature maps independently might not differentiate between the wings of *Anopheles* and *Aedes* genus, as color of both of their wings is dark. As a result of the outer product of both feature maps, it will produce one integrated feature map containing information from both of them. The resultant feature map can comprehend that the *Anopheles* wing has black color with dark spots. This will improve the accuracy and the confidence of the model. Pooling function P performs the summation on the outer product of all the generated matrices to transform them into a single matrix and then further reshape it to 1D vector 230 to feed as an input to the fully connected layer 240, used for classification function C. In this work, both NA and NB are the same CNN networks based on the ResNet50 [4] 800 architecture shown in FIG. 8.

It was trained on ImageNet [2] dataset to use a pre-trained model. ImageNet dataset consists of more than 14 million images distributed across 1000 classes. To make fA 210 and fB 220 learn different features, the system extracted them from different CNN layers of ResNet50 architecture, for example, one layer is res3c_branch2a (62nd layer) as fA 210 and another is res3d_branch2b (75th layer)) as fB 220 at each location of an Image 250. ResNet50 is a deep convolutional network with residual connections between sequential layers. The residual connection in this architecture helps in preventing gradient vanishing problem.

Using the same architecture for both NA and NB helps in reducing the memory overhead that could have caused by having two different networks.

Now that the rationale of a neural net architecture for anatomy classification is clarified in one non-limiting example, there are several key parameters in the architecture (called as hyperparameters) that need to be optimized. This disclosure elucidates these below, following which the final architecture for genus identification based on thorax images FIG. 1 *a, e, i*, will be presented. Also one may note that since the four non-limiting and example problems of interest to this paper (thorax, abdomen, wings and legs) all relate to classifying anatomies, the choice of hyperparameters are not going to be too different for each problem. Also, the choice of hyperparameters are finalized through repeated training and validation on the data set. The examples of this disclosure do not present all details of all hyperparameters that have been attempted during training in this paper, but only discuss choices of example hyperparameters that together gave the highest accuracies and contextual correctness in this non-limiting disclosure describing training and validation on a mosquito image dataset.

a). Image Resizing: To keep the images consistent, the images need resizing. This disclosure shows collected data from multiple smartphones, collecting data on anatomies of different resolutions. To bring uniformity, and reduce the image size (for faster training without loss of quality), this disclosure includes, but is not limited to, resizing each input image to 200×200 pixels irrespective of their original size. Finally, one non-limiting step normalized the RGB value of each pixel of the image by dividing it by 255 before training started.

b). Dealing with imbalanced class: Since an anatomy dataset is imbalanced, the model will develop a bias towards the majority class. To overcome this, this disclosure shows using the cost-sensitive learning method that assigns higher weight to minority classes based on their sample counts. Weights are determined by Algorithm 1. The class weights of each class for each anatomy are shown in Table 2. The algorithm will impose a high cost penalty in case of minority class misclassification.

TABLE 2

Class Weight Details

| Anatomy | Aedes | Anopheles | Culex |
| --- | --- | --- | --- |
| Thorax | 1.221 | 1.0 | 1.341 |
| Abdomen | 1.189 | 1.0 | 1.246 |
| Wing | 1.831 | 1.0 | 2.014 |
| Leg | 1.565 | 1.0 | 1.711 | c). Optimizer: An optimizer is an algorithm which helps converge an architecture during training from an initial state to the optimized one where the loss is minimum. In this study, the disclosure employs Stochastic Gradient Descent (SGD). This optimizer helps in fast convergence.

d). Loss Function: This disclosure employed the categorical cross entropy loss function in this paper. This function minimizes the divergence of predicted and actual probability function without biasing towards any particular class. This is in comparison with other loss functions like focal loss and triplet loss functions that work better when variations in terms of complexities of entities within classes and their inter-variabilities are higher, neither of which is not true for our problem.

e). Learning Rate: This disclosure includes using Reduce Learning Rate On Plateau [10] technique. This technique reduces the learning rate by a factor of 0.5 when there is no improvement seen on validation loss for 5 epochs. Initial learning rate was set to be 1e-6. This technique is simple and effective for the example, non-limiting problem in this paper.

f). Architecture Fine-tuning and Compensating for Over-filling for Genus classification: Having discussed choices for key hyperparameters in the architecture, this disclosure continues with information regarding how the architecture is trained and fine-tuned for genus classification. Many steps are involved here including decision on which layer to start from the ResNet50 network shown in FIG. 8, how to add remaining layers for individual genus classification problems, how to assign weights to the feature maps, how to avoid overfitting problems, and finally, when to stop the training. Usually, a CNN architecture consists of several convolutional layers. Each of these layers learns different features from input image in training. While initial layers learn low-level features like edges or curves, a final few layers learn high-level features like patterns in wings or legs. Therefore, while exporting a pre-trained model for transfer learning, it is important to select right layer to extract the feature. In one example of this work, the classification initially started at layer 20 in the ResNet50 architecture. Starting from layers too early will lead to poor learning, and starting from layers too deep will likely lead to over-fitting and also induce computational overhead.

To start the training, one non-limiting example includes freezing the weights of ResNet50 layers and initializing the untrained fully-connected layers using Glorot uniform initialization technique [3].

In one example embodiment, this model was trained for a first 100 epochs with a large learning rate (0.001). This is because the large gradient updates triggered by the untrained weights of fully connected layers would wreck the learned weights in the ResNet50 layers. After 100 epochs, the system unfroze the ResNet50 layers and trained the complete model for another 200 epochs with a small learning rate (1e-6). One should note that during training (and as is common in complex classification problems), researchers identified that certain example models suffered from overfitting problems, which were compensate by infusing a combination of different regularization techniques between layers, namely dropout, and early stopping. Example embodiments use an early stopping technique to stop the training if the validation accuracy is not improved with a minimum delta of 0.0009 for 30 consecutive epochs. [7], [5], [9].

g). The Finalized Architecture for Genus Classification based on 4 Anatomies: Table 3 illustrates the key parameters of the finalized architecture for all the three models based on thorax, abdomen and wing anatomy. The architecture of a leg anatomy based model is slightly different which is shown in Table 4. The term res3dbranch2b denotes the 75$^{th}$ layer of the ResNet50 architecture, up to which was utilized for NA and res3c_branch2a (62nd layer of the ResNet50 utilized for NB). The remaining layers (elaborated upon below) are added after that as specified in Table 3. The entries in the fields "Size In" and "Size Out" in the table refer to the dimensions of the input and output matrices of the corresponding layer. Next, the method, system and apparatus disclosed herein calculated the outer product of the last convolutional layer from NA and NB. Then, this disclosure shows the flattened final product to reshape it to one dimensional matrix. Further, the methods stacked four fully-connected layers to the architecture and performed a softmax operation to calculate the output probabilities for final genus classification into three categories (i.e., *Aedes* 100, *Anopheles* 115 and *Culex* 120).

TABLE 4

Leg Architecture

| Layer | Size In | Size Out |
|---|---|---|
| res3d_branch2b (Layer 75 in ResNet50) | (None, 25, 25, 128) | (None, 25, 25, 128) |
| res3a_branch2a (Layer 40 in ResNet50) | (None, 50, 50, 256) | (None, 25, 25, 128) |
| Outer _Product and Flattening | res3d_branch2b and res3a_branch2a | (1, 16384) |
| dense_1 | (1, 16384) | 512 |
| dense_2 | 512 | 256 |
| dense_3 | 256 | 128 |
| dense_4 | 128 | 64 |
| so f tmax | 64 | 3 |

This disclosure also evaluates trained neural network models for genus classification based on anatomies from smartphone images using three evaluation strategies. First, the study visualizes the feature map obtained from the last convolution layer. This visualization will help the model understand the kind of features that the models are learning. Second, the system derived the Receiver Operating Characteristics ("ROC") plot and confusion matrix to interpret each model's performance independently. Third and finally, the system employed the soft-voting technique to merge the outputs from every anatomy model to make an aggregated decision on genus classification from a full-body mosquito image.

In one first evaluation, the approach was to determine whether or not trained models are actually able to focus in on the pixels corresponding to anatomical components within the anatomy image to classify, while simultaneously being able to exclude the background pixels. To do so, once an input anatomy image is classified after the end of the Softmax layer, the computer traverses back into the model to identify the feature map for that particular image (at the conclusion of the last convolutional layer), and the weights corresponding to the class (i.e., the type of genus) that the image was identified with.

Accordingly, one can denote the feature map for an image at Kernel k in the last convolutional layer as fk (i, j), and the weight of each kernel for class c as w$^c$k, then, compute the expression, $$Mc(i,j)=\Sigma_k w^c_k f_k(i,j) \qquad (1)$$

for each spatial location (i, j) in the convoluted image. Mc (i, j) essentially computes the importance of each feature map in the convoluted image when a classification is made. Subsequently, the value of Mc (i, j) in the convoluted image is projected back onto the corresponding pixels in the original image to create a heatmap.

The higher the value of Mc (i, j), the warmer the color of those corresponding pixels in a corresponding heatmap. These are the pixels within the image that were used predominantly to make the classification decision. As such, while analyzing the heat map, if most of the higher intensities pixels belong to the critical anatomical components of the mosquito image, then one can trust the model that it has been trained adequately, as elaborated below.

Figure 3:
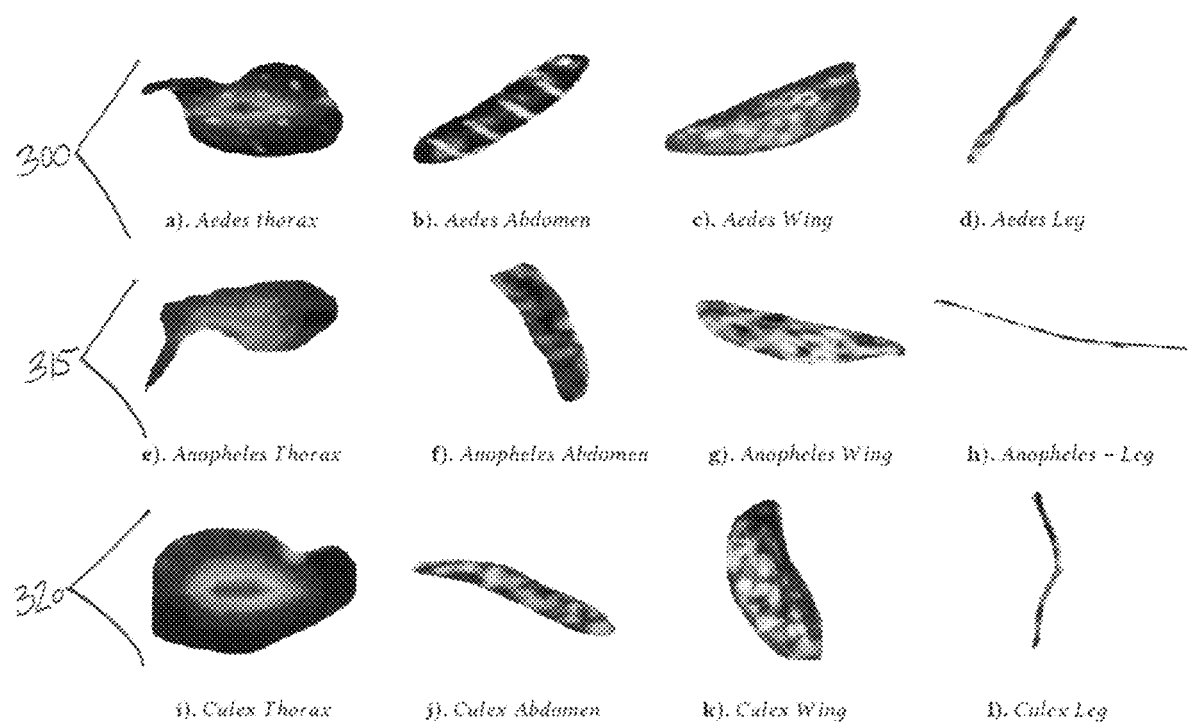
FIG. 3 illustrates one representative image sample with visualization of a last layer convolution feature map in the dataset for each species classified, across multiple backgrounds and phones, according to example embodiments of this disclosure.

In FIG. 3, this disclosure specifically highlights one representative heat map image for each anatomy within all three genus categories *Aedes* 300, *Anopheles* 315, and *Culex* 320. FIG. 3 shows that irrespective of the background, camera or image quality, the pixels with the highest intensities are concentrated in anatomical component of the image.

The results on accuracy of classification for each anatomy model has been reviewed independently. To recall, this process started by having at least one image dataset of 3064 thorax images, 2757 abdomen images, 4459 wing images, and 5533 leg images from 3250 mosquito images each belonging to the three genera—*Aedes* 100, 300, *Anopheles* 115, 315 and *Culex* 120, 320. Subsequently, 20% and 10% of these images were separated out for validation and testing respectively.

Figure 5:
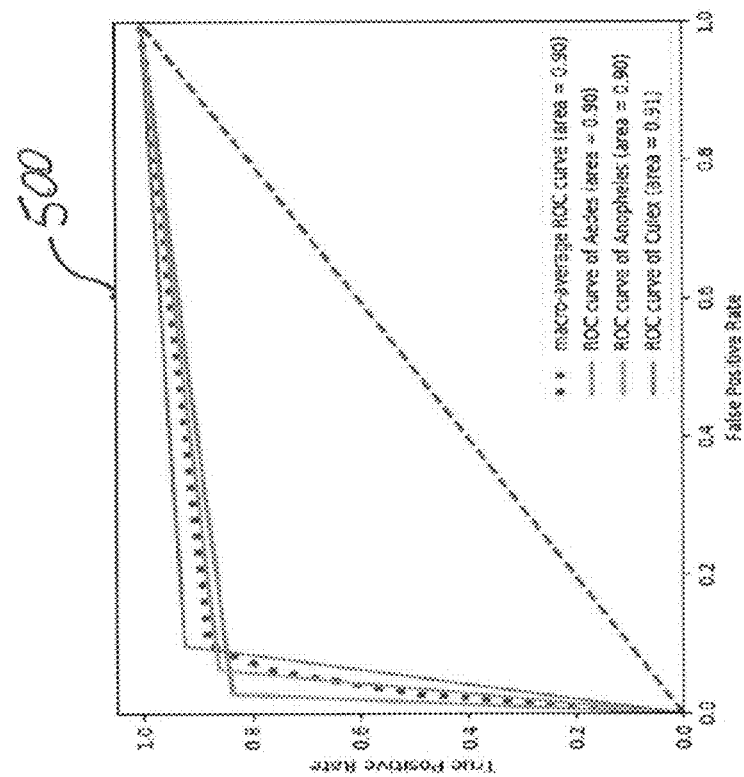
FIG. 5 illustrates a graphical representation of Receiver Operating Characteristics of a thorax data set in example embodiments of this disclosure.
Figure 4:
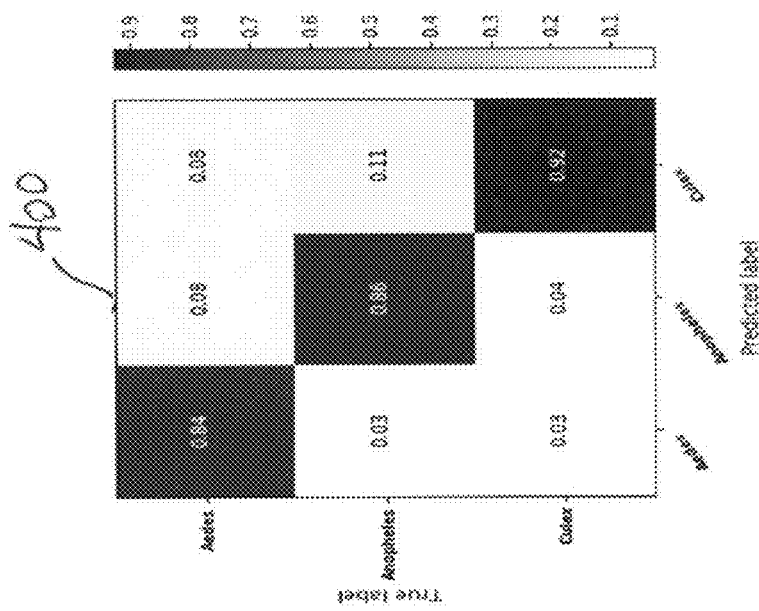
FIG. 4 illustrates a grid plot of a confusion matrix for a thorax data set according to one example embodiment of this disclosure.

Validation Accuracy and Testing Accuracy: Table 5 summarizes the results for each of the four anatomy (thorax, abdomen, wing and leg) based models trained to predict the genus category of a given mosquito image. The classification accuracies presented are those wherein the validation loss did not decrease for 30 consecutive epochs, after which training was concluded. The classification accuracies presented in the table show the recall (proportion of correctly identified images within each class) value of each class. The AUC (area under the curve) value for ROC (receiver operating characteristic) curve for thorax, abdomen, wing and leg models on testing dataset are 0.90, 0.86, 0.82, and 0.76 respectively. The AUC value is equal to the probability that a classifier will rank a randomly chosen positive instance higher than a randomly chosen negative one (assuming 'positive' ranks higher than 'negative'). FIG. 4 shows confusion matrix 400 and FIG. 5 shows the ROC curve 500 of the testing sets for each anatomy model.

Aggregated Results from All 4 Anatomy Based Models

This section presents the aggregated genus classification results from anatomy based models by combining their outputs. In order to do that, the model randomly selected 300 mosquito images evenly distributed among the three genus from the test dataset. Next, the aim was to compute the probability of each anatomy image belonging to a particular genus—*Aedes* 100, 300, *Anopheles* 115, 315 and *Culex* 120, 320—using respective anatomy models. Once the independent genus probability is collected from each anatomy model, a soft-voting [8] technique was ensued to make the final classification decision. In a soft-voting technique, the probability of each genus class obtained from each anatomy model is aggregated and, whichever class gets the highest probability gets selected as the final genus class. This method achieved 91.3% accuracy on 300 mosquito specimens selected from the test dataset.

Figures 6, 7:
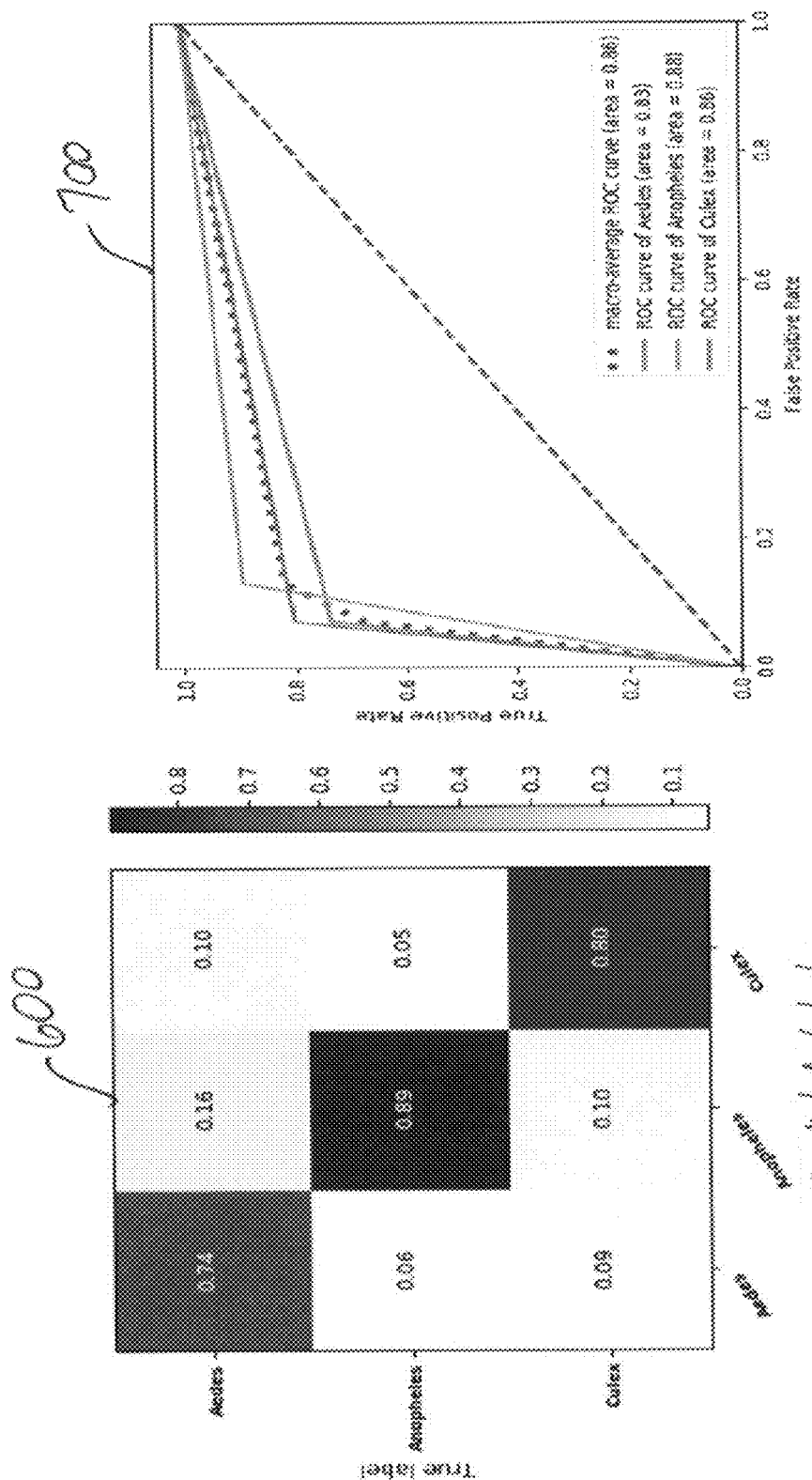
FIG. 6 illustrates a graphical representation of a confusion matrix of an abdomen data set in example embodiments of this disclosure.
FIG. 7 illustrates a graphical representation of Receiver Operating Characteristics of an abdomen data set in example embodiments of this disclosure.

FIG. 6 shows the confusion matrix 600 and FIG. 7 shows the ROC curve 700 of testing sets for each anatomy model. The AUC value of ROC curve is 0.93.

TABLE 5

Validation and Testing Set Accuracy

| Anatomy | Validation Set (%) | Testing Set (%) |
|---|---|---|
| Thorax | 88.41 | 87.33 |
| Abdomen | 81.05 | 81 |
| Wing | 78.18 | 75.80 |
| Leg | 70.61 | 68.02 |

Discussions on Results: While compiling our results, we made few interesting observations. First off, the accuracy computed on training, validation and testing images from all the four models are virtually identical as shown in Table 5. It demonstrates that the models are robust and neither overfitted nor underfitted, two most common problems in any machine learning models. Secondly, this disclosure recognized that a cost sensitive learning to reduce the biasness from the data helped us to secure higher AUC value from the ROC curve shown in FIGS. 4-7. A confusion matrix derived from every model have better accuracy for *Anopheles* genus 115. It is generally true that even for experts, visually recognizing *Anopheles* (a malaria vector) is easy because of its black thorax, abdomen and distinct wings with dark spots. *Aedes* 100 generally confuses with *Anopheles* due to their dark colors. Similarly, *Aedes* confuses with *Culex* 120 because *Aedes infirmatus* species looks similar to *Culex* genus. Third, the ensemble model has outperformed each of independent anatomy models as well as previous models discussed in this paper. The examples herein show the results for a designed, trained and evaluated anatomy based deep neural network models for mosquito genus classification from smartphone images. The neural network models are based on bilinear CNN architecture that helped overcome low intra-class variance problem. Additionally, anatomy segmentation made models robust against diverse background and, poor camera and image quality. These results, and the right contexts in which the results should be interpreted, give the confidence that the proposed system is indeed practical.

This disclosure, therefore, illustrates a Deep Neural Network Framework to extract anatomical components, such as but not limited to, thorax, wings, abdomen and legs from mosquito images. The technique is based on the notion of Mask R-CNN 800 of FIG. 8, wherein artificial intelligence iteratively learns feature maps 808 from images 802, emplaces anchors (shown as bounding boxes 812 in the Figures but can be any shape) around foreground components, followed by segmenting 820 and classification 824 of pixels corresponding to the anatomical components within anchors. In some embodiments, results of this disclosure show that the techniques are favorable when interpreted in the context of being able to glean descriptive morphological markers for classifying mosquitoes.

Figure 8:
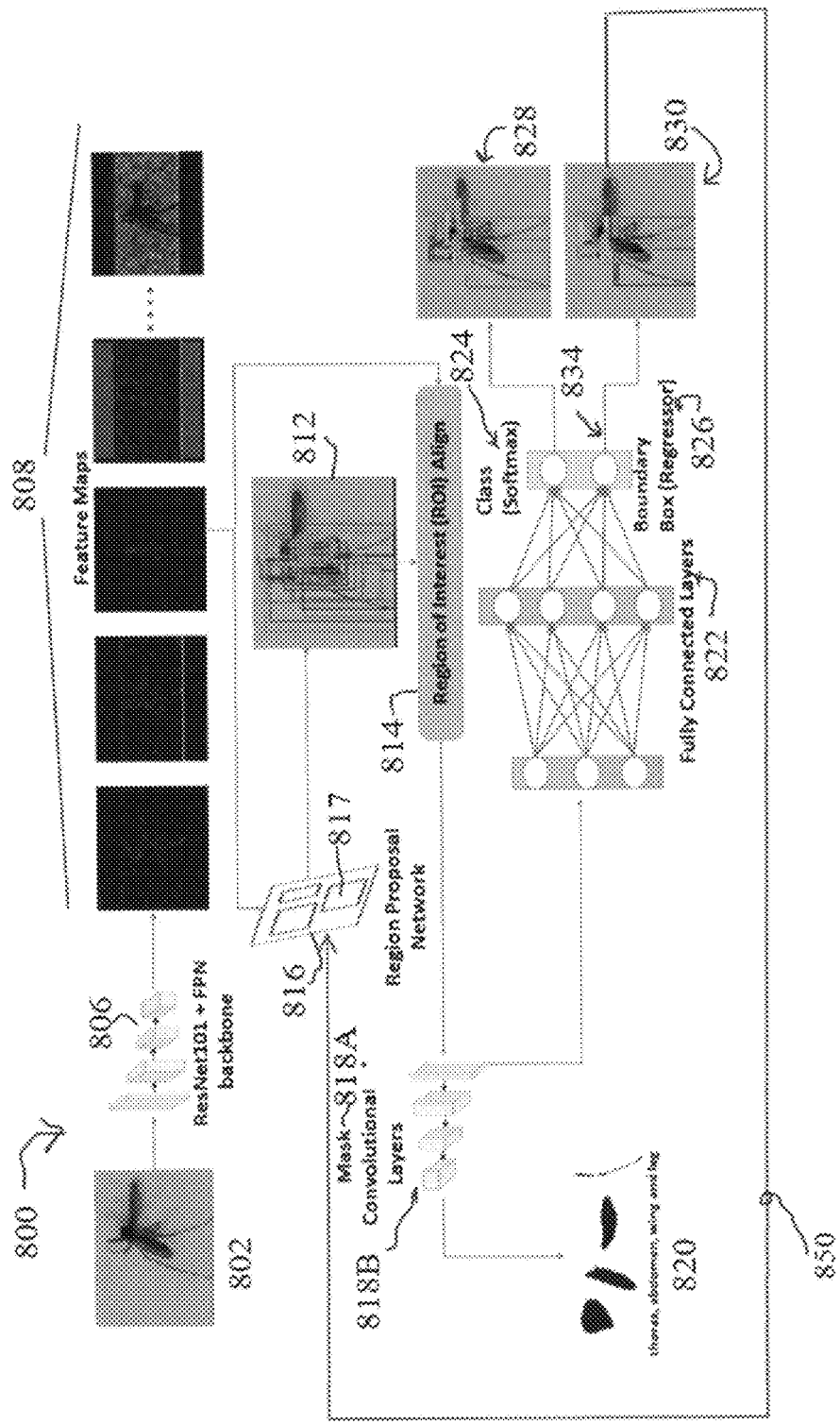
FIG. 8 is a schematic diagram of a convolutional neural network ("CNN") used in a computer environment configured to implement the computerized methods of this disclosure.

A general discussion of CNNs and associated terminology can be found in numerous references cited below. For example, Reference 12 (Stewart) explains how filters, made of multiple kernels (weighted matrices) are convolved onto original images to create feature maps of numerous layers and adaptable data density. Shepard explains using the feature maps to pool certain layers with techniques such as max pooling, that separates out those feature maps with maximum values to reduce complexity. Rectified Non-Linear Unit (Re-LU) data sets are added to the feature maps to identify areas that should be accounted for but were missed when the changes from one pixel to the next were below a filtering threshold. In very simplistic terms, the Re-Lu is an activation function operated on the image to produce layers that may be appended to the feature maps as shown in FIG. 8. Generally, in some non-limiting embodiments, the Re-LU may retain a certain filter's value at a respective output matrix index or insert a zero if that certain index value is negative. The overall concept of a convolutional neural network, therefore, incorporates convolutional layers as feature maps of the original image, pooling layers and ReLU layers for added detail, as well as fully connected layers that are data rich outputs that are combined. As noted at Ref. 12 (Stewart), the fully connected layers, such as those shown in the non-limiting example of FIG. 8, aggregate all information into a finally replicated image.

This disclosure presents a system to design state of the art AI techniques, namely techniques based on Mask Region-Based Convolutional Neural Networks, to extract anatomical components of mosquitoes from digital images and archiving them permanently based on genus, species and other taxonomies. Investigators using the techniques of this disclosure have generated close to 30,000 digital images of mosquitoes (taken via smartphones) that are tagged based on genus and species type. Once anatomies of interest are extracted, this disclosure explains novel AI techniques to design a model that can recognize genus and species types of mosquitoes. Should the methods and systems described herein be popular among citizens and experts, and if investigation agencies can recruit entomologists to use these techniques, there is every expectation to globally scale up the effort to include many more mosquito types and improve models over time.

In some aspects, the present disclosure relates to computerized apparatuses, computer implemented methods, and computerized systems that use digital image analysis to identify species of insect specimens, such as, but not limited to mosquitos. The disclosure presents a system wherein a user (expert or an ordinary citizen) takes a photo of a mosquito or other pests, using a smart-phone, and then the image is immediately sent to a central server along with GPS information data of the smart-phone.

The server will implement algorithms described in this disclosure to a) identify the genus of the mosquito; b) identify the species of the mosquito; c) separate the body parts of the image into objects of interest like wings, legs, proboscis, abdomen, scutum etc.; d) give feedback on species and genus back to user, along with information as to what diseases the species carry, and more interesting information like flight range etc. Potential uses are in mosquito identification, since it is a painful and cognitively demanding problem now. School districts could also use this software application to teach kids about biology and other areas of science, given that these kinds of scientific analysis skills may eventually be mandatory for schools in many areas. Defense and Homeland Security agencies and other government agencies may see a need for the computerized application described herein.

One non-limiting value proposition of this disclosure is the ability to bypass humans (that peer through a microscope currently) for classification, and instead use digital cameras and proposed techniques for automated classification of genus and species type. A secondary value proposition is the ability of a system with large scale citizen and expert generated imagery, with tagging, to start digitizing anatomies of mosquitoes across the globe. This database could prove invaluable for training, and global information sharing in the context of mosquito, and especially vector surveillance.

Although example embodiments of the present disclosure are explained in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways. For example, the test results and examples all pertain to identification of genus and species of mosquitos from the mosquito traits and features extracted from digital images. The techniques and concepts utilized and claimed in this disclosure, however, are not limited to mosquitos, but can be used with other kinds of identification processes for other animals, humans, plants and the like.

ResNet has been generally described at He, Kaiming, Xiangyu Zhang, Shaoqing Ren, and Jian Sun. "Deep residual learning for image recognition." In Proceedings of the IEEE conference on computer vision and pattern recognition, pp. 770-778. 2016, which is incorporated by reference in its entirety as if set forth fully herein and cited at Ref. 33. ResNet is characterized in part as having a very deep network and introduces a residual connection to get the input from the previous layer to the next layer. The residual connection helps in solving gradient vanishing problems by detecting the smallest of differences between layers of the convolution. The next step is to design an object detector network that does three tasks: classifying the bounding boxes 210, 220, 230, 240 with respective anatomies, tightening the boxes, and generating a mask 818 (i.e., pixel-wise segmentation 820) of each anatomical component. In constructing the architecture of the object detector network, non-limiting examples of this disclosure have used per-pixel sigmoid, and binary cross-entropy loss function (to identify the "k" anatomical components) and rigorously train them.

As shown in FIG. 8, the systems and methods herein include applying bounding boxes 817 that are tailored to mark the feature maps 808 for respective features of the image, such as respective anatomical portions of a mosquito's body in the examples of this disclosure. The bounding boxes 812, 817 are organized pursuant to a region proposal network 816 for each feature of interest. As noted above, the examples of the figures are not limiting, as the bounding boxes may take any shape, including but not limited to rectangular. In one non-limiting example, the bounding boxes 812, 817 are proposed as shown at Ref. 816 based upon computer driven systems learning from the training sets that gradient changes in the pixels of respective convolved image layers may correspond to a certain anatomical feature if the gradient occurs in a certain area of the convolved image layer. The systems and methods utilize regressive processes, loss theories, and feedback from one feature map to the next to make the bounding boxes more and more precise and more tailored to one feature of interest (e.g., a thorax, a leg, an abdomen, a wing for an insect). Suggested separations, or segmenting, of pixels correspond to these features of interest.

In certain non-limiting embodiments, the process of honing in the bounding boxes 812, 817 for respective sets of anatomical pixels making up a body part is paired with an alignment process 814 that ensures that the output of the region proposal network 816 still matches outlines set forth in the original feature maps 808. Once this alignment is complete, and as shown in the non-limiting example of FIG. 8, the systems and methods disclosed herein are subject to masking operations, or pixel extraction, in a second convolutional neural network 818. The second convolutional neural network provides segmented images 820 in which certain examples result in anatomical pixels corresponding to a thorax, abdomen, wing, and leg of an insect. The output of the bounding boxes 812 applied by the region proposal network 816 is also fed to fully connected neural network layers 822. It is notable that the second convolutional neural network 818 utilizes convolutional layers that are filtered so that each "neuron" or matrix index within a data layer subject to a convolution are separately calculated and more sparse. The fully connected layers 822 track each prior layer more closely and are more data rich. The last fully connected layer is transmitted to both a classifier 824 and a boundary box regressor 826. The fully connected layers 822 are actually tied to each other layer by layer, neuron by neuron as shown by the arrows. The final fully connected layer 834 is the output layer and includes all data for all layers. In separate parallel operations, a boundary box regressor 826 and a classification processor 824 are applied to each layer of the first convolutional neural network 806 and/or the second convolutional neural network 818. The bounding box regressor 826 utilizes error function analyses to regressively tighten the bounding boxes 812 more accurately around a respective feature of interest. This kind of feedback loop 850 ensures that the bounding boxes 812, 817 of the region proposal network 816 provide convolved image layers that are distinct for each feature sought by the feature maps 808. The classifier 824 provides automated computerized processes to identify and label respective sets 828 of anatomical pixels identifying each anatomical part of the subject insect from the original image 802.

The system utilizes the processor or other computers to apply anchors 812, 817 to the feature maps 808, wherein the anchors identify portions of respective layers of image data in the feature maps that contain respective anatomical pixels for respective body parts. In other words, the feature maps may be multidimensional layers of image data, and the system can operate on individual layers of image data or multiple sets of layers of image data that have resulted from the first convolutional neural network 806. The anchors may take the form of any polygon that bounds a desired set of anatomical pixels within images, feature maps, or layers of image data. In one non-limiting example, the anchors are bounding boxes that are generated by the computer processor and shown on a graphical display unit as being within or superimposed on the images. The software further includes an alignment function 814 to align layers having anchors 812, 817 thereon with the original feature maps.

The system uses these anchors in generating a mask 818A that segments the respective anatomical pixels from the respective layers of image data. Generating the mask may include applying a second convolutional neural network 818B to the respective layers, wherein the second convolutional neural network segments the anatomical pixels according to a corresponding respective body part.

The mask allows for extracting fully connected layers 822 from the respective layers that have had the first convolutional neural network 806 applied thereto, and the system is further configured for applying the fully connected layers to a regressor network 826 and a classification network 824, wherein generating the mask for segmenting, applying the fully connected layers to a regressor network, and applying the fully connected layers to a classification network are parallel operations conducted by the software. In certain non-limiting embodiments generating the mask includes applying a second convolutional neural network to the respective layers, wherein the second convolutional neural network segments the anatomical pixels according to a corresponding respective body part.

In some non-limiting embodiments, the parallel operations occur simultaneously.

The regressor network 826 is a software program implemented by a computer to calculate error values regarding iterative positions for the anchors in the respective layers. The system uses the error values in a feedback loop 850 to tighten the anchors 812, 817 around anatomical pixels corresponding to a respective body part. The regressor network and associated computer-implemented software calculates error values regarding iterative positions for the anchors in the respective layers and wherein the error values are derived from a binary cross entropy loss function or a focal loss function.

The anchors 812, 817 may be bounding boxes, or any other shape, originating from a region proposal network 816 receiving the feature maps 808 as respective layers of image data, and the feedback loop 850 transmits error values from the regressor network 826 to the region proposal network 817 to tighten the boxes onto appropriate pixels corresponding to the respective body parts. The region proposal network is an image processing software implementation that utilizes data from the feature maps to predict probable portions of images and layers of images that contain anatomical pixels corresponding to an insect body part.

The classification network 824 is a software tool implemented by a computer for generating classification output images 828, and in some embodiments, these classification output images include updated versions of original images with bounding polygons 812, 817 therein, labels for anatomical component names thereon, and even color coding as shown in the tables that may aid in genus and species identification. The example embodiments herein shows the system identifying insects such as a mosquito and anatomical component names including wings, legs, thorax, and abdomen corresponding to the respective body parts. In some non-limiting embodiments, the classification network utilizes a per-pixel sigmoid network. In non-limiting uses, the system populates a database storing tested outputs of the classification network, wherein the outputs include image versions with labels of anatomical component names thereon, and wherein the database stores respective genus and species information with corresponding data about respective genera and species.

The system embodiment may be implemented with at least one computer that performs a computerized method of extracting information about anatomical components of a living creature from an image. The images may include digital images of insects or other animals or even inanimate objects, wherein the digital images include views of respective insects, animals, or inanimate objects from directly above the specimen and from side angles relative to a background holding the respective specimens. By training a mask-region based convolutional neural network with a set of training images, segmented with computerized algorithms, the method begins by identifying ground truth anatomical components to a set degree of accuracy. The training for the convolutional neural networks used in this disclosure generally includes classifying respective anatomical components in the training images and comparing the training images to the ground truth images. By tightening bounding boxes surrounding the anatomical components in the digital images, the method learns how to maximize efficiency and accuracy in ultimately generating a mask for use in extracting information of a second set of images, such as feature maps that have been previously created. For forming the ground truth images, the computerized algorithm may utilize an image annotator tool configured for manual operation. The training iteratively updates hyperparameters that target anatomical pixels in a training data set. This method has a proven track record of tracking, identifying, and archiving genera and species identifying data for a plurality of species of a plurality of genera of insects.

In one non-limiting embodiment, a system 200 for identifying a genus and species of an insect includes using an imaging device, such as one of the above noted "smart" phones and computer devices gathering digital images. These devices are configured to generate images 250 of the insect at issue in a convenient manner, possibly even by a lay person. A computer processor 902 is connected to memory 904 storing computer implemented commands in software. The memory 904 receives the images 250 and the software implements a computerized method with the respective images. The method includes the steps of using a computer 900, the computer processor 902, computer memory 904, and even networked computer resources for applying a first convolutional neural network 205 to the respective images to develop at least a first feature map 210 and a second feature map 220 based on anatomical pixels at corresponding image locations (l) in the respective feature maps. The anatomical pixels correspond to a body part of the insect. The computer 200 then proceeds to calculate an outer product of the first feature map and the second feature map and forming an integrated feature map 230 from the first feature map 210 and the second feature map 220. The artificial intelligence of this disclosure is programmed to extract fully connected layers 822 from respective sets of integrated feature maps that have had the first convolutional neural network applied thereto. By applying the fully connected layers to a classification network the genus and the species of the insect may be identified.

The convolutional neural networks operate in a loop that converges according to criteria and thresholds set by a user, so the computers of this disclosure are configured to calculate at least respective first feature maps 210 and respective second feature maps 220 for a plurality of corresponding image locations (l) throughout each of the gathered images.

This allows for the system to calculate respective outer products from the respective first feature maps and respective second feature maps and develop respective integrated feature maps 230 from the outer products. The plurality of corresponding image locations collectively include a designated number of pixels from a respective image gathered by the imaging device and resized to include at least the designated number of pixels. As noted above, the first feature map and the second feature map are selected from different layers of calculations within the first convolutional neural network.

In another non-limiting embodiment, a system for identifying a genus and species of an insect includes an imaging device configured to generate images of the insect. A computer processor is connected to memory storing computer implemented commands in software, and the memory receiving the images 250, 802, wherein the software implements a computerized method by applying a first convolutional neural network 210 to the respective images 250, 802 to develop at least a first feature map 210 directed to anatomical pixels at corresponding image locations (1) in the respective images 250, 802, and the anatomical pixels correspond to a body part of the insect. A second convolutional neural network 220 is also applied to the respective images to develop at least a second feature map directed to anatomical pixels at corresponding image locations in the respective images, said anatomical pixels corresponding to a body part of the insect. The system calculates an outer product of the first feature map and the second feature map, forming an integrated feature map 230 from the first feature map and the second feature map. As noted above, the integrated feature maps may be each one dimensional feature maps. By extracting fully connected layers from respective sets of integrated feature maps that have had the first convolutional neural network and the second convolutional neural network applied thereto, a classification network 824 can be configured for identifying the genus and the species of the insect. In this non-limiting embodiment, the system applies the two convolutional neural networks 210, 220 to an entirety of the image by calculating respective first feature maps and respective second feature maps for a plurality of corresponding image locations (subsets of anatomical pixels within the image), calculating respective outer products from the respective first feature maps and respective second feature maps, and developing respective integrated feature maps from the outer products. The plurality of corresponding image locations collectively include the entirety of the image or cover a designated number of pixels from a respective image gathered by the imaging device and resized to include at least the designated number of pixels. In non-limiting embodiments, the first feature map and the second feature map are selected from different layers of calculations within the respective convolutional neural networks.

Applying respective weights to the first feature map and the second feature map may provide for more equal distributions of class representation in the calculations of the convolutional neural networks. In this regard, the weights may be higher weights for minority classes of the images. The method implemented by the system may include freezing the respective weights for the duration of the method. In any event, the system has access to the above discussed validity and error analysis for each of the first convolutional neural network and the second convolutional neural network, and the system may include computer implemented instructions for reducing a respective learning rate by a common factor that depends upon an error rate threshold.

This disclosure incorporates a computerized method of identifying a genus and species of an insect, the method may be performed by computerized instructions stored on a server, a computer, or any non-transitory computer readable media used for storing computer instructions for computer program products. The method includes the steps of acquiring images of an insect and storing pixels data from the images in a computer memory in data communication with a computer processor and using the computer processor to perform steps of the method. The steps include, but are not limited to applying at least one convolutional neural network to the respective images to develop at least a first feature map and a second feature map based on anatomical pixels at corresponding image locations in the respective feature maps, said anatomical pixels corresponding to a body part of the insect; calculating an outer product of the first feature map and the second feature map; forming an integrated feature map from the first feature map and the second feature map; extracting fully connected layers from respective sets of integrated feature maps that have had the first convolutional neural network applied thereto; and applying the fully connected layers to a classification network for identifying the genus and the species of the insect.

The computer processor may also be configured to further perform additional steps including computing an importance factor for each feature map in an output image that has been a subject of the classification network and using a selected output image with the highest importance factor, compare the selected output image with the respective images to evaluate an accuracy level of the classification network.

Overall, this disclosure is configured for applying at least one convolutional neural network that may include, but is not limited to, at least one Bi-Linear Convolutional Neural Network as described above. The Bi-Linear Convolutional Neural Network includes applying the first feature map and the second feature map to identify respective features from the images and applying a pooling function to an output of the Bi-Linear Convolutional Neural Network before applying the fully connected layers to the classification network. In some non-limiting embodiments, the method includes stopping the application of the at least one convolutional neural network upon a validation accuracy converging to a threshold value. The method may be characterized in part, and without limitation as applying the at least one convolutional neural network to respective sets of anatomical pixels with each of the respective sets corresponding to a respective body part of the insect. The system merges a plurality of outputs corresponding to the respective sets of anatomical pixels and uses the plurality of outputs and making an aggregated decision on genus and species classification.

In example implementations, at least some portions of the activities may be implemented in software provisioned on a networking device. In some embodiments, one or more of these features may be implemented in computer hardware 900, provided external to these elements, or consolidated in any appropriate manner to achieve the intended functionality. The various network elements may include software (or reciprocating software) that can coordinate image development across domains such as time, amplitude, depths, and various classification measures that detect movement across frames of image data and further detect particular objects in the field of view in order to achieve the operations as outlined herein. In still other embodiments, these elements may include any suitable algorithms, hardware, software, components, modules, interfaces, or objects that facilitate the operations thereof.

Furthermore, computer systems described and shown herein (and/or their associated structures) may also include suitable interfaces for receiving, transmitting, and/or otherwise communicating data or information in a network environment. Additionally, some of the processors 902 and memory elements 904 associated with the various nodes may be removed, or otherwise consolidated such that single processor and a single memory element are responsible for certain activities. In a general sense, the arrangements depicted in the Figures may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory can store data used for the operations described herein. This includes the memory being able to store instructions (e.g., software, logic, code, etc.) in non-transitory media, such that the instructions are executed to carry out the activities described in this Specification. A processor can execute any type of computer readable instructions associated with the data to achieve the operations detailed herein in this Specification. In one example, processors (e.g., processor) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Figure 9:
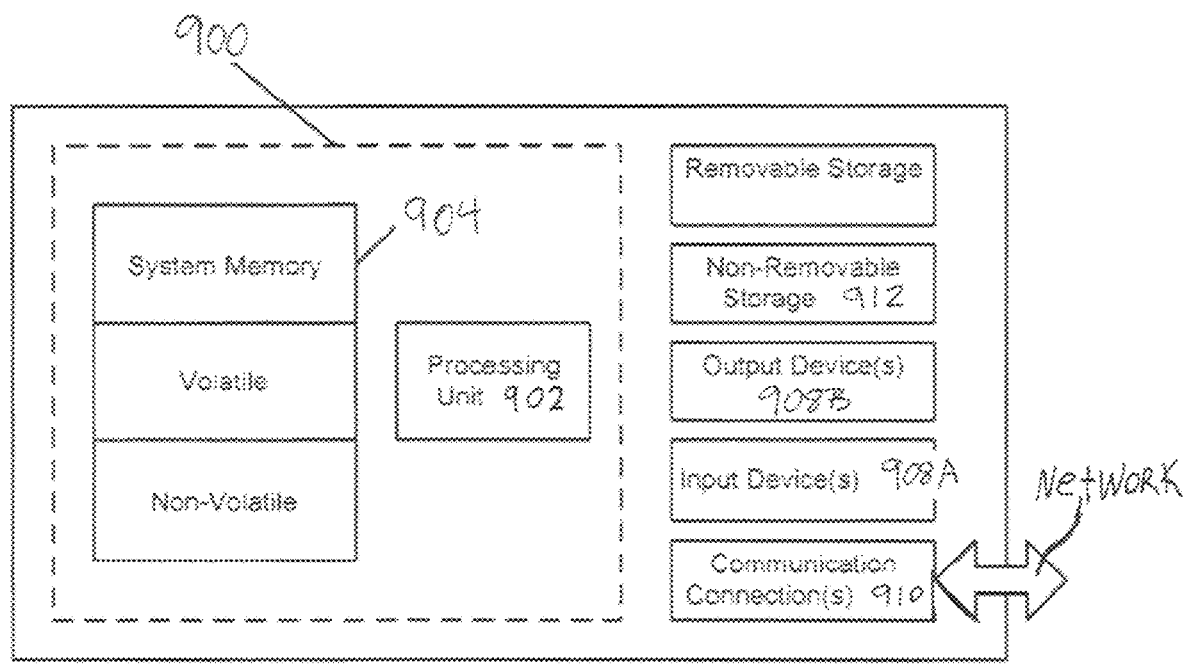
FIG. 9 is an example computer environment in which the systems and methods of this disclosure may be calculated, plotted, and output for use according to example embodiments of this disclosure.

These devices may further keep information in any suitable type of non-transitory storage medium 912 (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' See FIG. 9 for a schematic example showing a computing environment for input devices 908A, such as imaging devices described above, and output devices 908B such as smartphones. This computer environment is amenable to various network and cloud connections as shown at Ref. 906.

It must also be noted that, as used in the specification and the appended claims, the singular forms "a," "an" and "the" include plural referents unless the context clearly dictates otherwise. By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

Ranges may be expressed herein as from "about" or "approximately" one particular value to "about" or "approximately" another particular value. When such a range is expressed, exemplary embodiments include from the one particular value to the other particular value. As used herein, "about" or "approximately" generally can mean within 20 percent, preferably within 10 percent, and more preferably within 5 percent of a given value or range, and can also include the exact value or range. Numerical quantities given herein can be approximate, meaning the term "about" or "approximately" can be inferred if not expressly stated.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

REFERENCES

[1] Nathan D Burkett-Cadena. 2013. Mosquitoes of the southeastern United States. University of Alabama Press.

[2] Jia Deng, Wei Dong, Richard Socher, Li-Jia Li, Kai Li, and Li Fei-Fei. 2009. Imagenet: A large-scale hierarchical image database. In 2009 IEEE conference on computer vision and pattern recognition. Ieee, 248-255.

[3] Xavier Glorot and Yoshua Bengio. 2010. Understanding the difficulty of training deep feedforward neural networks. In Proceedings of the thirteenth international conference on artificial intelligence and statistics. 249-256.

[4] Kaiming He, Georgia Gkioxari, Piotr Dollár, and Ross Girshick. 2017. Mask r-cnn. In Proceedings of the IEEE international conference on computer vision. 2961-2969.

[5] Sergey Ioffe and Christian Szegedy. 2015. Batch normalization: Accelerating deep network training by reducing internal covariate shift. arXiv preprint arXiv: 1502.03167 (2015).

[6] Tsung-Yu Lin, Aruni RoyChowdhury, and Subhransu Maji. 2015. Bilinear cnn models for fine-grained visual recognition. In Proceedings of the IEEE international conference on computer vision. 1449-1457.

[7] Nitish Srivastava, Geoffrey Hinton, Alex Krizhevsky, Ilya Sutskever, and Ruslan Salakhutdinov. 2014. Dropout: a simple way to prevent neural networks from overfitting. The journal of machine learning research 15, 1 (2014), 1929-1958.

[8] Antanas Verikas, Arunas Lipnickas, Kerstin Malmqvist, Marija Bacauskiene, and Adas Gelzinis. 1999. Soft combination of neural classifiers: A comparative study. Pattern recognition letters 20, 4 (1999), 429-444.

[9] Yuan Yao, Lorenzo Rosasco, and Andrea Caponnetto. 2007. On early stopping in gradient descent learning. Constructive Approximation 26, 2 (2007), 289-315.

[10] Manzil Zaheer, Sashank Reddi, Devendra Sachan, Satyen Kale, and Sanjiv Kumar. 2018. Adaptive methods for nonconvex optimization. In Advances in neural information processing systems. 9793-9803.

[11] He, Kaiming, Xiangyu Zhang, Shaoqing Ren, and Jian Sun. "Deep residual learning for image recognition." In Proceedings of the IEEE conference on computer vision and pattern recognition, pp. 770-778. 2016.

[12] Stewart, Matthew Ph.D. Simple Introduction to Convolutional Neural Networks in *Towards Data Science* located at https://towardsdatascience.com/simple-introduction-to-convolutional-neural-networks-cdf8d3077bac.

The invention claimed is:

1. A system for identifying a genus and species of an insect, the system comprising:
    an imaging device configured to generate images of the insect;
    a computer processor connected to a memory storing computer implemented commands in software, the memory receiving the images, wherein the software implements the following computerized method with respective images:
    inputting the respective images to a first convolutional neural network, wherein at least a first feature map is obtained from a first layer of the first convolutional neural network and a second feature map is obtained from a second layer of the first convolutional neural network, wherein each of the first feature map and the second feature map is based on a subset of anatomical pixels at a corresponding image location, said subset of anatomical pixels corresponding to a body part of the insect, and wherein the first convolutional neural network is trained with a plurality of training images that each depict a single insect body part;
    assigning a respective weight to each of the first feature map and the second feature map based on a class associated with the respective body part of the insect;
    calculating an outer product of the first feature map and the second feature map;
    forming an integrated feature map from the outer product of the first feature map and the second feature map; and
    identifying the genus and the species of the insect based, at least in part, on the integrated feature map.

2. The system of claim 1, further comprising calculating respective first feature maps and respective second feature maps for a plurality of corresponding image locations, calculating respective outer products from the respective first feature maps and respective second feature maps, and developing respective integrated feature maps from the outer products.

3. The system of claim 2, wherein the plurality of corresponding image locations collectively comprises a designated number of pixels from a respective image gathered by the imaging device and resized to include at least the designated number of pixels.

4. The system of claim 1, wherein the first feature map and the second feature map are selected from different layers of calculations within the first convolutional neural network.

5. A system for identifying a genus and species of an insect, the system comprising:
    an imaging device configured to generate images of the insect;
    a computer processor connected to memory storing computer implemented commands in software, the memory receiving the images, wherein the software implements the following computerized method with respective images:
    inputting the respective images to a first convolutional neural network, wherein at least a first feature map directed to anatomical pixels at corresponding image locations in the respective images is obtained from the first convolutional neural network, said anatomical pixels corresponding to a body part of the insect;
    inputting the respective images to a second convolutional neural network, wherein at least a second feature map directed to anatomical pixels at corresponding image locations in the respective images is obtained from the second convolutional neural network, said anatomical pixels corresponding to the body part of the insect, wherein each of the first convolutional neural network and the second convolutional neural network is trained with a plurality of training images that each depict a single insect body part;
    assigning a respective weight to each of the first feature map and the second feature map based on a class associated with the respective body part of the insect;
    calculating an outer product of the first feature map and the second feature map;
    forming an integrated feature map from the outer product of the first feature map and the second feature map; and
    identifying the genus and the species of the insect based, at least in part, on the integrated feature map.

6. The system of claim 5, further comprising calculating respective first feature maps and respective second feature maps for a plurality of corresponding image locations, calculating respective outer products from the respective first feature maps and respective second feature maps, and developing respective integrated feature maps from the outer products.

7. The system of claim 6, wherein the plurality of corresponding image locations collectively comprise a designated number of pixels from a respective image gathered by the imaging device and resized to include at least the designated number of pixels.

8. The system of claim 5, wherein the first feature map and the second feature map are selected from different layers of calculations within the respective convolutional neural networks.

9. The system of claim 5, wherein the integrated feature maps are each one dimensional feature maps.

10. The system of claim 5, further comprising resizing the images to a common size.

11. The system of claim 5, further comprising, for each of the first convolutional neural network and the second convolutional neural network, reducing a respective learning rate by a common factor that depends upon an error rate threshold during training of the respective convolutional neural network.

12. A computerized method of identifying a genus and species of an insect, the method comprising:
    acquiring images of an insect and storing pixel data from the images in a computer memory in data communication with a computer processor;
    using the computer processor to perform the following steps of the method:
    inputting the images to at least one convolutional neural network to, wherein at least a first feature map is obtained from a first layer of the at least one convolutional neural network and at least a second feature map is obtained from a second layer of the at least one convolutional neural network, wherein each of the first feature map and the second feature map is based on a subset of anatomical pixels at a corresponding image location in the respective feature maps, the subset of anatomical pixels corresponding to a body part of the insect, and wherein the at least one convolutional neural network is trained with a plurality of training images that each depict a single insect body part;

assigning a respective weight to each of the first feature map and the second feature map based on a class associated with the respective body part of the insect;

calculating an outer product of the first feature map and the second feature map;

forming an integrated feature map from the first feature map and the second feature map; and identifying the genus and the species of the insect based, at least in part on the integrated feature map.

13. The computerized method of claim 12, wherein the at least one convolutional neural network comprises at least one Bi-Linear Convolutional Neural Network.

14. The computerized method of claim 13, wherein the at least one Bi-Linear Convolutional Neural Network comprises a pooling function or layer.

15. The computerized method of claim 12, wherein the at least one convolutional neural network is trained until an accuracy threshold value is met or exceeded.

16. The computerized method of claim 12, further comprising:

merging a plurality of outputs corresponding to the respective sets of anatomical pixels;

using the plurality of outputs and making an aggregated decision on genus and species classification.

* * * * *